United States Patent
Joy et al.

(10) Patent No.: US 11,577,844 B2
(45) Date of Patent: Feb. 14, 2023

(54) VARIABLE DIAMETER PICCOLO TUBE FOR ANTI-ICING SYSTEM

(71) Applicant: ROHR, INC., Chula Vista, CA (US)

(72) Inventors: Joewin Joy, Ernakulam (IN); Senthilkumar Radhakrishnan, Bangalore (IN)

(73) Assignee: Rohr, Inc., Chula Vista, CA (US)

( * ) Notice: Subject to any disclaimer, the term of this patent is extended or adjusted under 35 U.S.C. 154(b) by 80 days.

(21) Appl. No.: 17/128,049

(22) Filed: Dec. 19, 2020

(65) Prior Publication Data
US 2021/0284346 A1 Sep. 16, 2021

(30) Foreign Application Priority Data

Mar. 12, 2020 (IN) .............................. 202041010650

(51) Int. Cl.
| | | |
|---|---|---|
| *F02C 7/047* | (2006.01) | |
| *B64D 15/04* | (2006.01) | |
| *B64D 33/02* | (2006.01) | |

(52) U.S. Cl.
CPC ............. *B64D 15/04* (2013.01); *B64D 33/02* (2013.01); *B64D 2033/0233* (2013.01); *F02C 7/047* (2013.01)

(58) Field of Classification Search
CPC .................... B64D 15/04; B64D 33/02; B64D 2033/0233; F02C 7/047
See application file for complete search history.

(56) References Cited

U.S. PATENT DOCUMENTS

| | | | |
|---|---|---|---|
| 4,752,049 A | | 6/1988 | Cole |
| 5,841,079 A | * | 11/1998 | Parente .................. F02C 7/047 |
| | | | 244/134 B |
| 8,931,252 B2 | | 1/2015 | Richardson |
| 10,167,085 B2 | | 1/2019 | Wiberg et al. |
| 10,487,738 B2 | | 11/2019 | Versaevel et al. |
| 2014/0263837 A1 | | 9/2014 | Sternberger |
| 2017/0217593 A1 | | 8/2017 | Ishida et al. |
| 2017/0314465 A1 | | 11/2017 | Beutin et al. |

FOREIGN PATENT DOCUMENTS

| | | |
|---|---|---|
| EP | 2527253 | 11/2012 |
| EP | 3196123 | 7/2017 |
| GB | 486549 | 6/1938 |
| WO | 2009112743 | 9/2009 |

OTHER PUBLICATIONS

Brown et al., "Heat Transfer Correlation for Anti-icing Systems", Journal of Aircraft, http://arc.aiaa.org, DOI: 10.2514/2.2896, Jan.-Feb. 2002, pp. 65-70, vol. 39, No. 1.
European Patent Office, European Search Report dated Jul. 19, 2021 in Application No. 21162157.8.

* cited by examiner

*Primary Examiner* — Steven M Sutherland
(74) *Attorney, Agent, or Firm* — Snell & Wilmer L.L.P.

(57) ABSTRACT

A piccolo tube for an anti-icing system may comprise an annular tube and a plurality of openings formed along a circumference of the annular tube. The annular tube may comprise a first cross-sectional diameter at an inlet point and a second cross-sectional diameter at a distal point. The second cross-sectional diameter is less than first cross-sectional diameter. The distal point may be 180° from the inlet point.

14 Claims, 4 Drawing Sheets

VARIABLE DIAMETER PICCOLO TUBE FOR ANTI-ICING SYSTEM

CROSS-REFERENCE TO RELATED APPLICATIONS

This application claims priority to, and the benefit of, India Patent Application No. 202041010650, filed Mar. 12, 2020 and titled "VARIABLE DIAMETER PICCOLO TUBE FOR ANTI-ICING SYSTEM," which is incorporated by reference herein in its entirety for all purposes.

FIELD

The present disclosure relates to aircraft nacelles and, more particularly, to a variable diameter piccolo tube for anti-icing systems.

BACKGROUND

A nacelle for a turbine engine typically includes an inlet, a fan cowl, a thrust reverser, and an exhaust section. The nacelle is typically mounted to a wing or a fuselage of an aircraft via a pylon. An anti-icing systems may be employed to prevent or minimize ice build-up along the nacelle inlet.

SUMMARY

A piccolo tube for an anti-icing system is disclosed herein. In accordance with various embodiments, the piccolo tube may comprise an annular tube and a plurality of openings formed along a circumference of the annular tube. The annular tube may comprise a first cross-sectional diameter at an inlet point and a second cross-sectional diameter at a distal point. The second cross-sectional diameter may be less than the first cross-sectional diameter, and the distal point may be 180° from the inlet point.

In various embodiments, the annular tube may be tapered from the inlet point to the distal point. In various embodiments, an area of a first opening of the plurality of openings is approximately equal to an area of a second opening of the plurality of openings, the first opening being located proximate the inlet point and the second opening being located proximate the distal point.

In various embodiments, a conduit may be fluidly coupled to the annular tube at the inlet point.

In various embodiments, the annular tube may comprise a first portion having a constant cross-sectional diameter and a second portion that is tapered. The first portion may comprise the inlet point. In various embodiments, the plurality of openings may include a first group of openings located in the first portion and a second group of openings located in the second portion. The first group of openings may increase in area in a direction extending from the inlet point to the second portion.

In various embodiments, each opening in the second group of openings may be equal in area.

An inlet for a nacelle is also disclosed herein. In accordance with various embodiments, the inlet may comprise an outer barrel, an inner barrel, a lip skin located at a forward end of the outer barrel, and a piccolo tube defining a plurality of openings oriented toward the lip skin. The piccolo tube may comprise a first cross-sectional diameter at an inlet point and a second cross-sectional diameter at a distal point. The second cross-sectional diameter may be less than the first cross-sectional diameter, and the distal point may be 180° from the inlet point.

In various embodiments, a conduit may be fluidly coupled to the piccolo tube at the inlet point. In various embodiments, the piccolo tube may be tapered from the inlet point to the distal point. In various embodiments, an area of a first opening of the plurality of openings may be approximately equal to an area of a second opening of the plurality of openings. The first opening may be located proximate the inlet point and the second opening being located proximate the distal point.

In various embodiments, the piccolo tube may comprise a first portion having a constant cross-sectional diameter and a second portion that is tapered. The first portion may comprise the inlet point.

In various embodiments, the plurality of openings may include a first group of openings located in the first portion of the piccolo tube and a second group of openings located in the second portion of the piccolo tube. A first opening located in the first portion of the piccolo tube may have an area that is less than an area of a second opening located in the first portion of the piccolo tube. The first opening may be located proximate the inlet point and the second opening may be located proximate the second portion of the piccolo tube. The first group of openings includes the first opening and the second opening.

In various embodiments, each opening in the second group of openings may have an area that is approximately equal to an area of the second opening in the second group of openings.

In various embodiments, the plurality of openings may include a first group of openings located in the first portion of the piccolo tube and a second group of openings located in the second portion of the piccolo tube. A first opening located in the second portion of the piccolo tube may have an area that is less than an area of a second opening located in the second portion of the piccolo tube. The first opening may be located proximate the first portion of the piccolo tube and the second opening may be located proximate the distal point. The second group of openings includes the first opening and the second opening.

A propulsion system is also disclosed herein. In accordance with various embodiments, the population system may comprise a gas turbine engine, a nacelle located around the gas turbine engine, a piccolo tube defining a plurality of openings oriented toward a surface of the nacelle, and a conduit fluidly coupled between the gas turbine engine and an inlet point of the piccolo tube. The piccolo tube may comprise a first cross-sectional diameter at the inlet point and a second cross-sectional diameter at a distal. The second cross-sectional diameter may be less than the first cross-sectional diameter, and the distal point may be 180° from the inlet point.

In various embodiments, the piccolo tube may be tapered from the inlet point to the distal point. In various embodiments, each opening of the plurality of openings may be approximately equal in area.

In various embodiments, the piccolo tube may comprise a first portion having a constant cross-sectional diameter and a second portion that is tapered. The first portion may comprise the inlet point.

In various embodiments, the first portion may extend between ±10° and ±90° from the inlet point about a central longitudinal axial of the gas turbine engine.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Surface shading and/or crosshatching lines may be used throughout the figures to denote different parts, but not necessarily to denote the same or different materials. Throughout the present disclosure, like reference numbers denote like elements. Accordingly, elements with like element numbering may be shown in the figures, but may not necessarily be repeated herein for the sake of clarity.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component.

Figure 1A:
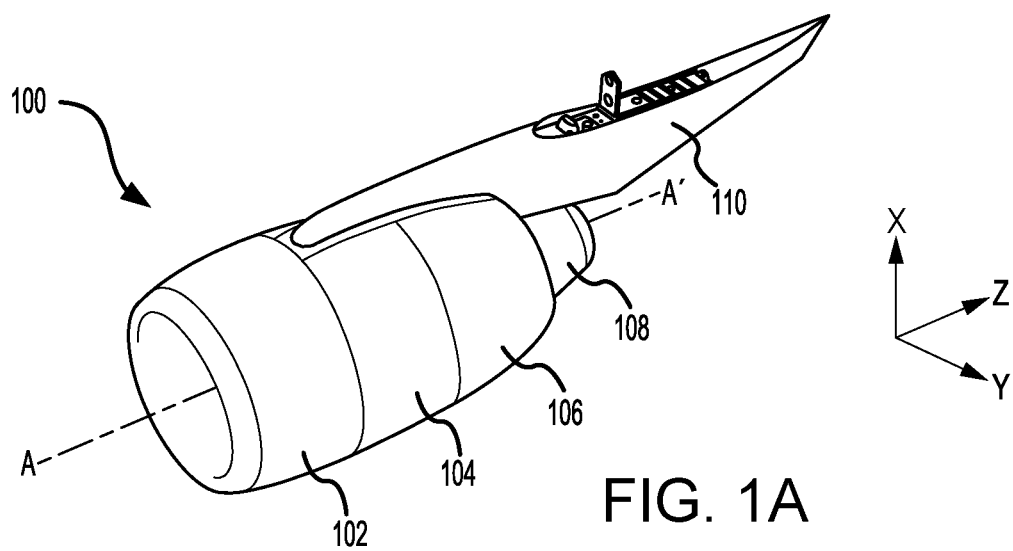
FIG. 1A illustrates a perspective view of a nacelle, in accordance with various embodiments.

Referring to FIG. 1A, a nacelle 100 of a propulsion system is illustrated, in accordance with various embodiments. Nacelle 100 may comprise an inlet 102 (also referred to as a nacelle inlet), a fan cowl 104, a thrust reverser 106, and an exhaust system 108. Nacelle 100 provides smooth aerodynamic surfaces for airflow around and into a gas turbine engine housed within nacelle 100. Nacelle 100 may be coupled to a pylon 110. Pylon 110 may be configured to mount nacelle 100 and the gas turbine engine surrounded by nacelle 100 to an aircraft wing or aircraft body.

Figure 1B:
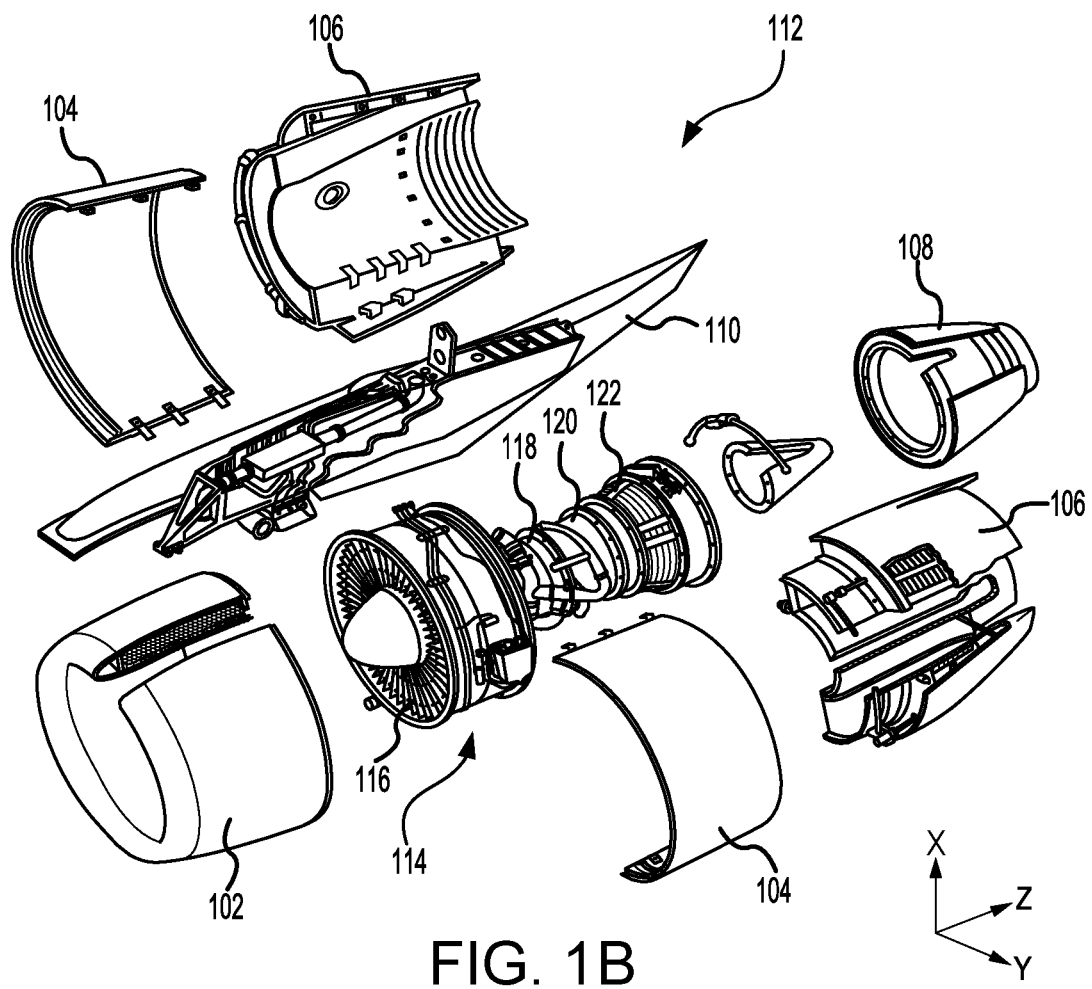
FIG. 1B illustrates an exploded view of a propulsion system, in accordance with various embodiments.

Referring now to FIG. 1B, and with continuing reference to FIG. 1A, an exploded view of a propulsion system 112 is illustrated, in accordance with various embodiments. In accordance with various embodiments, propulsion system 112 includes nacelle 100 and a gas turbine engine 114. Gas turbine engine 114 may be surrounded by components of nacelle 100. Nacelle 100 may provide smooth aerodynamic surfaces for airflow around and into gas turbine engine 114. Nacelle 100 may define at least a portion of one or more bypass air duct(s) through propulsion system 112.

A fan 116 of gas turbine engine 114 draws and directs a flow of air into and through propulsion system 112. The air may be divided into two principal flow paths: a core flow path through the core of gas turbine engine 114, and a bypass flow path through one or more bypass ducts outside of the core of gas turbine engine 114. The air in the core flow path may be directed through a compressor section 118 of gas turbine engine 114 that increases the air flow pressure and then through a combustor 120 of gas turbine engine 114 where the air is mixed with fuel and ignited. The combustion of the fuel and air mixture is received by a series of turbine blades in a turbine section 122 of gas turbine engine 114. The combustion gases cause the turbine blades to rotate and drive the rotors and fan 116 of gas turbine engine 114. The rotor stages (i.e., rotating airfoils or blades) of fan 116, compressor section 118, and turbine section 122 of gas turbine engine 20 may rotate about an engine central longitudinal axis A-A'. The exhaust gases exiting the turbine section 122 of gas turbine engine 114 may be directed through exhaust system 108. The air in the bypass flow path may be directed around the engine core through one or more bypass duct(s) defined, at least partially, by nacelle 100.

Figure 2A:
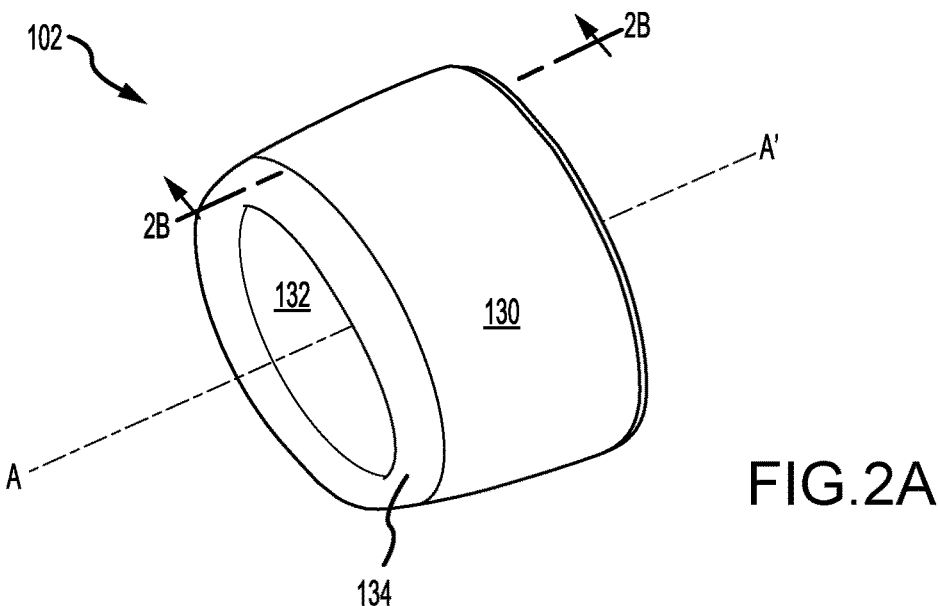
FIG. 2A illustrates a perspective view of a nacelle inlet, in accordance with various embodiments.
Figure 2B:
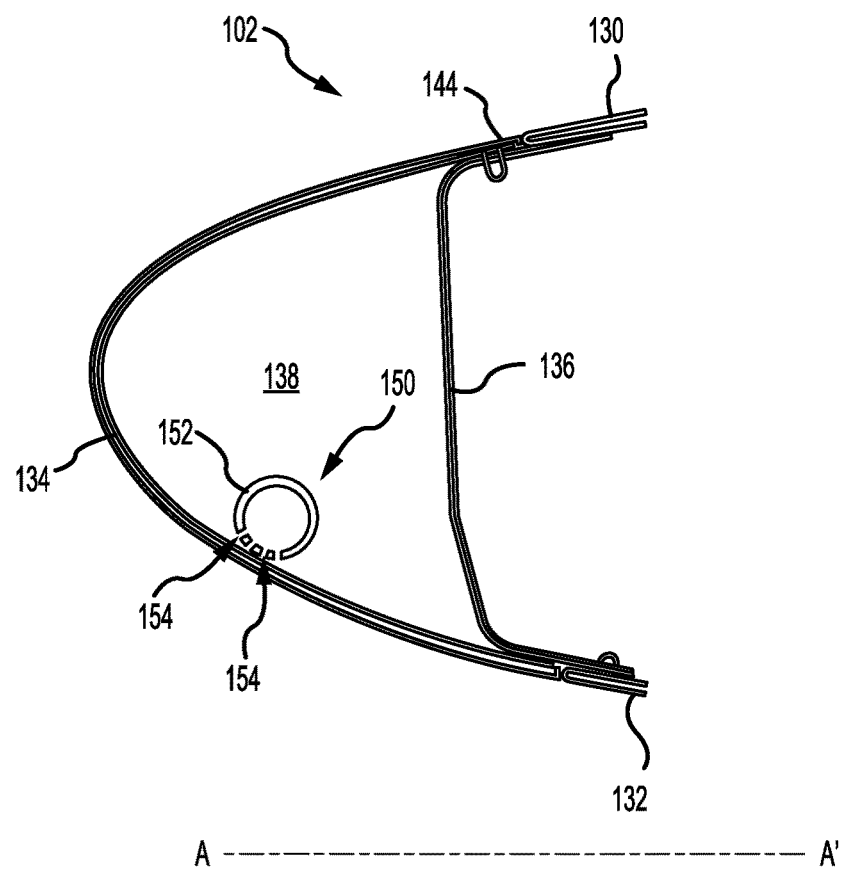
FIG. 2B illustrates a cross-section view of a nacelle inlet taken along the line 2B-2B in FIG. 2A, in accordance with various embodiments.

Referring to FIGS. 2A and 2B, inlet 102 is illustrated, in accordance with various embodiments. In various embodiments, inlet 102 may include a first (or outer) barrel 130 and a second (or inner) barrel 132 located radially inward of first barrel 130. Inlet 102 further includes a lip skin 134 and a bulkhead 136 extending between first barrel 130 and second barrel 132. Lip skin 134 may be located at and may define a forward end of inlet 102. In this regard, lip skin 134 may be located forward of first barrel 130, second barrel 132, and bulkhead 136. Lip skin 134 and bulkhead 136 may define a forward volume 138 of inlet 102. First barrel 130, second barrel 132, lip skin 134, and bulkhead 136 may each comprise a generally annular structure, which may be disposed around engine central longitudinal axis A-A'. Engine central longitudinal axis A-A' extends in a forward to aft direction. As used herein, the term "axial" refers to directions parallel to engine central longitudinal axis A-A', the term "circumferential" refers to direction about engine central longitudinal axis A-A', and the term "radial" refers to directions normal to engine central longitudinal axis A-A'.

In accordance with various embodiments, inlet 102 may include an anti-icing system 150. Anti-icing system 150 includes a piccolo tube 152 configured to direct an impingement flow at lip skin 134. In this regard, piccolo tube 152 may define a plurality of openings 154. In various embodiments, piccolo tube 152 may be located in forward volume 138. The impingement flow tends to prevent or reduce ice build-up on inlet 102. While anti-icing system 150 is illustrated as including one piccolo tube 152 located in forward volume 138, it is contemplated and understood that anti-icing system 150 may include any number of piccolo tubes 152 positioned at other locations or at multiple locations along inlet 102 and/or position along any other annular structure that may susceptible to ice build-up.

Figure 3:
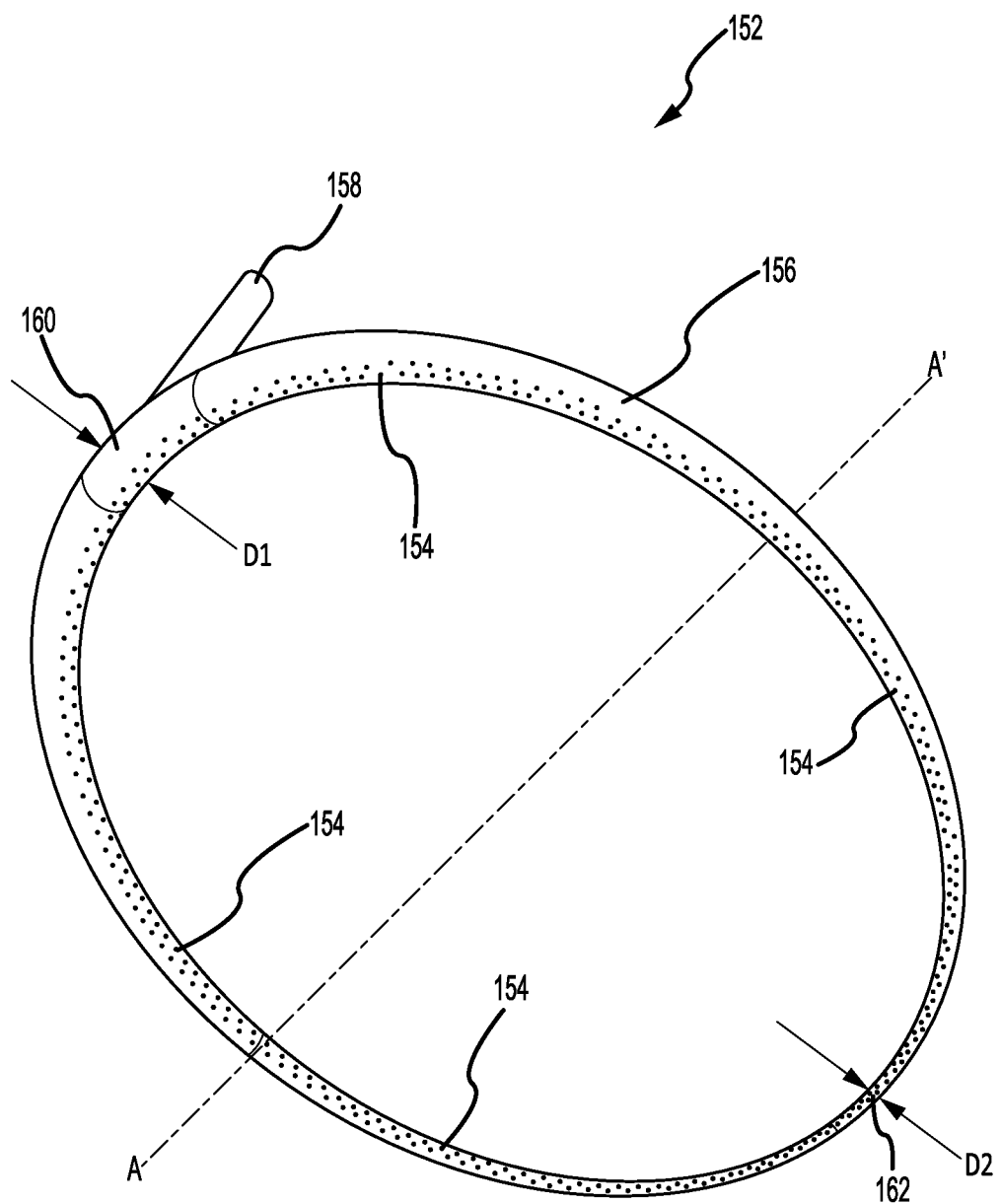
FIG. 3 illustrates a perspective view of a piccolo tube for an anti-icing system, in accordance with various embodiments.

Referring to FIG. 3, piccolo tube 152 of anti-icing system 150 is illustrated. In accordance with various embodiments, piccolo tube 152 comprises an annular-shaped tube 156. Tube 156 may be formed from metal, metal alloy, composite, ceramic, or any other desired material. Tube 156 defines openings 154. In accordance with various embodiments, a conduit 158 is fluidly coupled to tube 156. Conduit 158 may provide fluid (e.g., air) bled from gas turbine engine 114, with momentary reference to FIG. 1A, to tube 156. For example, conduit 158 may provide fluid bled from compressor section 118. Conduit 158 is located at an inlet point 160 of tube 156.

In accordance with various embodiments, tube 156 comprises a cross-sectional diameter D1 at inlet point 160. In various embodiments, the cross-sectional diameter of tube 156 is greatest at inlet point 160. In accordance with various embodiments, the cross-sectional diameter of the tube 156 decreases between inlet point 160 and a distal point 162 located 180°, about engine central longitudinal axis A-A', from inlet point 160 and conduit 158. In this regard, tube 156 comprises a cross-sectional diameter D2 at distal point 162 that is less than the cross-sectional diameter D1 of tube 156 at inlet point 160. In various embodiments, the cross-sectional diameter of tube 156 may decrease continuously between inlet point 160 and distal point 162. In various embodiments, the diameter or area of each of openings 154 is consistent, or approximately equal, about the circumference of tube 156 (i.e., about engine central longitudinal axis A-A'). As used in the previous context "approximately equal" means±5% difference in area. In this regard, an opening 154 located proximate distal point 162 may be equal in area to an opening 154 located proximate inlet point 160.

In various embodiments, a ratio of cross-sectional diameter D1 to cross-sectional diameter D2 may be between 20:1 and 1.5:1. In various embodiments, a ratio of cross-sectional diameter D1 to cross-sectional diameter D2 may be between 10:1 and 2:1. In various embodiments, a ratio of cross-sectional diameter D1 to cross-sectional diameter D2 may be between 5:1 and 3:1.

The varied cross-sectional diameter of tube 156 tends to modify mass flow rates at different points about tube 156, such that the fluid flow (also referred to as impingement flow) out openings 154 is consistent about longitudinal axis A-A'. Stated differently, the cross-sectional diameter along tube 156 is selected such that impingement flow (i.e., the volume of fluid that passes per unit of time) through each of openings 154 is approximately equal about longitudinal axis A-A'. As used in the previous context, "approximately equal" means±10% difference in flow rate. In accordance with various embodiments, a rate of change in cross-sectional diameter of tube 156 is selected to generate a fluid flow and pressure within tube 156 that produces an impingement flow through of openings 154 (i.e., a volume of fluid that passes through an opening 154 per unit of time (e.g., per second)) that is approximately equal about longitudinal axis A-A'. In this regard, a volume of fluid that passes per second through an opening 154 located at inlet point 160 is approximately equal to a volume of fluid that passes per second through an opening 154 located at distal point 162 and is approximately equal to a volume of fluid that passes per second through an opening 154 located 90° about engine central longitudinal axis A-A' from inlet point 160. As used in the previous context "approximately equal" means±10% difference in flow rate. A more equal impingement flow tends to increase the uniformity of the temperature and of the heating along the circumference of lip skin 134, with momentary reference to FIG. 2A, thereby increasing an effectiveness of the anti-icing system.

Figure 4:
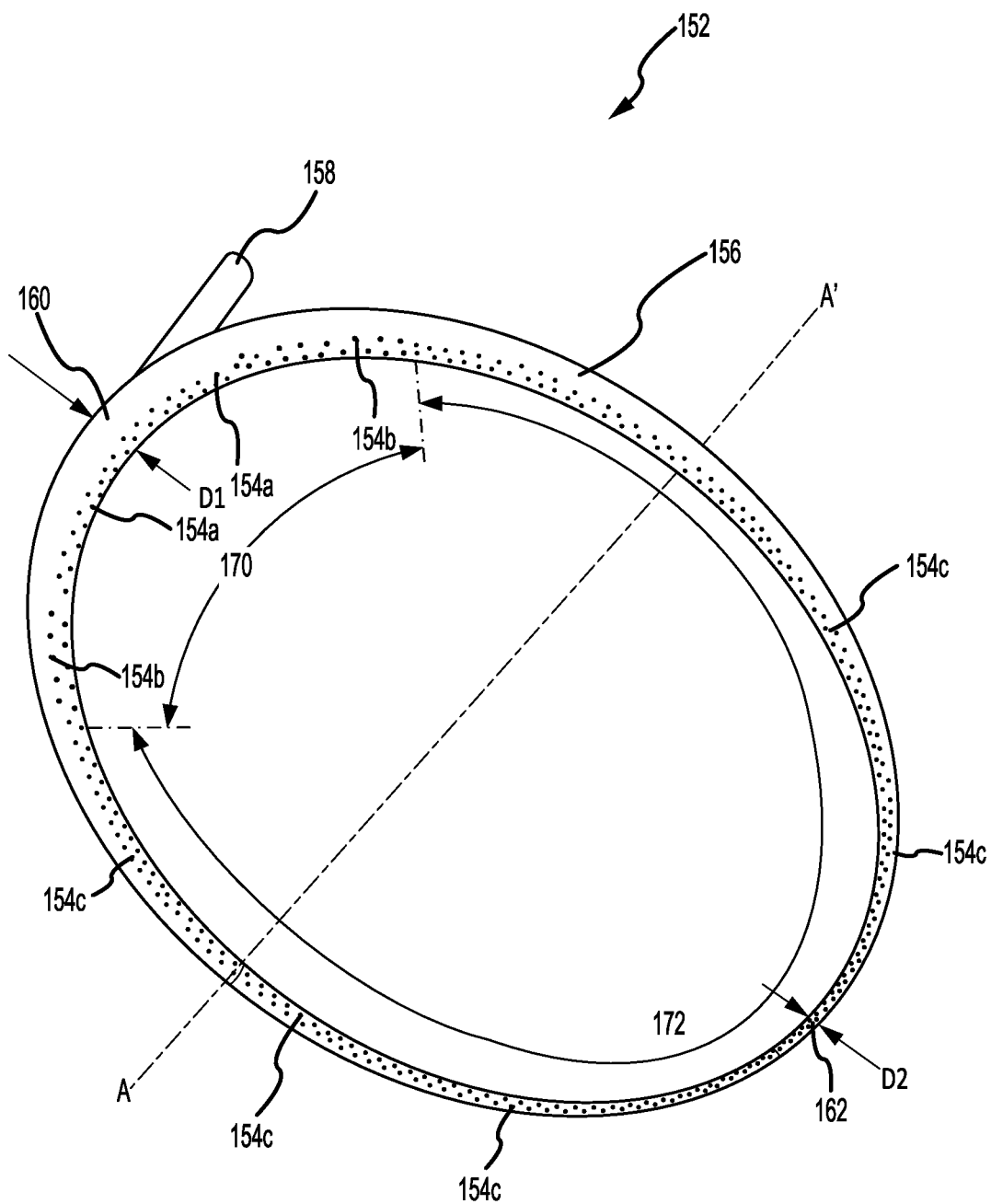
FIG. 4 illustrates a perspective view of a piccolo tube for an anti-icing system, in accordance with various embodiments.

In various embodiments, tube 156 may include a first portion having a constant cross-sectional diameter and a second portion having a tapered cross-sectional diameter. For example, and with reference to FIG. 4, in various embodiments, a first portion 170 of of tube 156 comprises cross-sectional diameter D1, and a second portion 172 of tube 156 may comprise a cross-sectional diameter that decreases from cross-sectional diameter D1 to cross-sectional diameter D2. First portion 170 of tube 156 may extend circumferentially about engine central longitudinal axis A-A' from inlet point 160. Second portion 172 of tube 156 may extend from the first portion 170 of tube 156 to the distal point 162. In various embodiments, first portion 170 may between ±10° and ±135° about engine central longitudinal axis A-A' from inlet point 160, between ±30° and ±90° about engine central longitudinal axis A-A' from inlet point 160, or any desired length. For example, in various embodiments, first portion 170 may extend from inlet point 160 to −45° from inlet point 160 and from inlet point 160 to +45°, and second portion 172 may extend from distal point 162 to −45° from inlet point 160 and from distal point 162 to +45° from inlet point 160. In various embodiments, first portion 170 may extend ±90°, about engine central longitudinal axis A-A', from inlet point 160 and second portion 172 may extend from ±90°, about engine central longitudinal axis A-A', from distal point 162.

In various embodiments, the diameter and/or area of the openings 154 is consistent throughout the first portion 170 and second portion 172, such that the diameter and/or area of the openings 154 in first portion 170 is equal to the diameter and/or area of the openings 154 in second portion 172.

In various embodiments, the diameter and/or area of the openings 154 in the first portion 170 and/or second portion 172 may be varied. In various embodiments, a diameter and/or area of the openings 154 in first portion 170 may increase in a direction extending from inlet point 160 toward second portion 172. For example, a first group of openings 154a may have a diameter and/or area that is less than the diameter and/or area of a second group of openings 154b in first portion 170. The first group of openings 154a may be more proximate inlet point 160, as compared to the second group of openings 154b. In various embodiments, the openings 154c in second portion 172 may be equal in diameter and/or area to one another. In various embodiments, the openings 154c in second portion 172 may be equal in diameter and/or area to the second group of openings 154b in first portion 170. In various embodiments, the openings 154c in second portion 172 may be equal in diameter and/or area to the first group of openings 154a in first portion 170. In various embodiments, the openings 154c in second portion 172 may increase in diameter and/or area in a direction extending from first portion 170 to distal point 162. In accordance with various embodiments, the cross-sectional diameter of tube 156 and the area of the openings 154 in the tube 156 (e.g., openings 154*a*, 154*b* and 154*c*) are selected to impact mass flow rates at different points about tube 156 and to cause the impingement flow through the openings 154 to be approximately equal about tube 156. As used in the previous context, "approximately equal" means±10% difference in flow rate.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different crosshatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A piccolo tube for an anti-icing system, comprising:
   an annular tube, wherein the annular tube comprises a first portion having a constant cross-sectional diameter and a second portion that is tapered, the first portion comprising an inlet point; and
   a plurality of openings formed along a circumference of the annular tube, wherein the annular tube comprises a first cross-sectional diameter at the inlet point and a second cross-sectional diameter at a distal point, the second cross-sectional diameter being less than the first cross-sectional diameter, and the distal point being 180° from the inlet point.

2. The piccolo tube of claim 1, wherein an area of a first opening of the plurality of openings is approximately equal to an area of a second opening of the plurality of openings, the first opening being located proximate the inlet point and the second opening being located proximate the distal point.

3. The piccolo tube of claim 2, further comprising a conduit fluidly coupled to the annular tube at the inlet point.

4. The piccolo tube of claim 1, wherein the plurality of openings includes a first group of openings located in the first portion and a second group of openings located in the second portion, and wherein the first group of openings increase in area in a direction extending from the inlet point to the second portion.

5. The piccolo tube of claim 4, wherein each opening in the second group of openings is equal in area.

6. An inlet for a nacelle, comprising:
   an outer barrel;
   an inner barrel;
   a lip skin located at a forward end of the outer barrel; and
   a piccolo tube defining a plurality of openings oriented toward the lip skin, wherein the piccolo tube comprises a first portion having a constant cross-sectional diameter and a second portion that is tapered, the first portion comprising an inlet point and wherein the piccolo tube comprises a first cross-sectional diameter at the inlet point and a second cross-sectional diameter at a distal point, the second cross-sectional diameter being less than the first cross-sectional diameter, and the distal point being 180° from the inlet point.

7. The inlet of claim 6, further comprising a conduit fluidly coupled to the piccolo tube at the inlet point.

8. The inlet of claim 6, wherein an area of a first opening of the plurality of openings is approximately equal to an area of a second opening of the plurality of openings, the first opening being located proximate the inlet point and the second opening being located proximate the distal point.

9. The inlet of claim 6, wherein the plurality of openings includes a first group of openings located in the first portion of the piccolo tube and a second group of openings located in the second portion of the piccolo tube, and wherein a first opening located in the first portion of the piccolo tube has an area that is less than an area of a second opening located in the first portion of the piccolo tube, the first opening being located proximate the inlet point and the second opening being located proximate the second portion of the piccolo tube, the first group of openings including the first opening and the second opening.

10. The inlet of claim 9, wherein each opening in the second group of openings has an area that is approximately equal to an area of the second opening in the second group of openings.

11. The inlet of claim 6, wherein the plurality of openings includes a first group of openings located in the first portion of the piccolo tube and a second group of openings located in the second portion of the piccolo tube, and wherein a first opening located in the second portion of the piccolo tube has an area that is less than an area of a second opening located in the second portion of the piccolo tube, the first opening being located proximate the first portion of the piccolo tube and the second opening being located proximate the distal point, the second group of openings including the first opening and the second opening.

12. A propulsion system, comprising:
    a gas turbine engine;
    a nacelle located around the gas turbine engine;
    a piccolo tube defining a plurality of openings oriented toward a surface of the nacelle, wherein the piccolo tube comprises a first portion having a constant cross-sectional diameter and a second portion that is tapered, the first portion comprising an inlet point and wherein the piccolo tube comprises a first cross-sectional diameter at the inlet point and a second cross-sectional diameter at a distal point, the second cross-sectional diameter being less than the first cross-sectional diameter, and the distal point being 180° from the inlet point; and
    a conduit fluidly coupled between the gas turbine engine and the inlet point of the piccolo tube.

13. The propulsion system of claim 12, wherein each opening of the plurality of openings is approximately equal in area.

14. The propulsion system of claim 12, wherein the first portion extends between ±10° and ±90° about a central longitudinal axial of the gas turbine engine from the inlet point.

* * * * *